United States Patent
Zweig et al.

(10) Patent No.: US 9,020,806 B2
(45) Date of Patent: Apr. 28, 2015

(54) GENERATING SENTENCE COMPLETION QUESTIONS

(71) Applicant: Microsoft Corporation, Redmond, WA (US)

(72) Inventors: Geoffrey G. Zweig, Sammamish, WA (US); Christopher J. C. Burges, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 13/690,424

(22) Filed: Nov. 30, 2012

(65) Prior Publication Data
US 2014/0156260 A1 Jun. 5, 2014

(51) Int. Cl.
G06F 17/27 (2006.01)
(52) U.S. Cl.
CPC ..................................... G06F 17/27 (2013.01)
(58) Field of Classification Search
CPC .............. G06F 17/27; G06F 17/30684; G06F 17/2735; G06F 17/30616; G09B 19/00; G09B 19/04; G09B 7/06
USPC ............ 704/1, 9, 10, 270, 167, 169; 434/167, 434/169
See application file for complete search history.

(56) References Cited

U.S. PATENT DOCUMENTS

| 5,885,083 | A * | 3/1999 | Ferrell | 434/156 |
|---|---|---|---|---|
| 6,120,297 | A * | 9/2000 | Morse et al. | 434/169 |
| 6,314,399 | B1 * | 11/2001 | Deligne et al. | 704/257 |
| 8,280,722 | B1 * | 10/2012 | Harik et al. | 704/9 |
| 8,521,515 | B1 * | 8/2013 | Harik et al. | 704/9 |
| 2003/0023420 | A1 * | 1/2003 | Goodman | 704/1 |
| 2010/0285435 | A1 * | 11/2010 | Keim et al. | 434/157 |
| 2011/0257961 | A1 * | 10/2011 | Tinkler et al. | 704/9 |
| 2013/0149681 | A1 * | 6/2013 | Tinkler et al. | 434/167 |
| 2013/0325436 | A1 * | 12/2013 | Wang et al. | 704/9 |

OTHER PUBLICATIONS

Zweig, et al., "A Challenge Set for Advancing Language Modeling", In Workshop on the Future of Language Modeling for HLT Co-located with NAACL-HLT, Jun. 8, 2012, 69 pages.
Zweig, et al.,"Computational Approaches to Sentence Completion", Retrieved on: Jun. 25, 2012, Available at: http://research.microsoft.com/pubs/163344/semco.pdf.
Bickel, et al.,"Predicting Sentences using N-Gram Language Models", In Proceedings of Human Language Technology Conference and Conference on Empirical Methods in Natural Language Processing (HLT/EMNLP)., Oct. 2005, pp. 193-200.
Heilman, Michael,"Automatic Factual Question Generation from Text", Retrieved on: Jun. 25, 2012, Available at: http://www2.lti.cs.cmu.edu/Research/Thesis/heilman,%20michael.pdf.

(Continued)

Primary Examiner — Douglas Godbold
(74) Attorney, Agent, or Firm — Sandy Swain; Judy Yee; Micky Minhas (57) ABSTRACT

The subject disclosure is directed towards automated processes for generating sentence completion questions based at least in part on a language model. Using the language model, a sentence is located, and alternates for a focus word (or words) in the sentence are automatically provided. Also described is automated filtering candidate sentences to locate the sentence, filtering the alternates based upon elimination criteria, scoring sentences with the correct word and as modified the alternates, and ranking the alternates. Manual selection may be used along with the automated processes.

20 Claims, 4 Drawing Sheets

(56) References Cited

OTHER PUBLICATIONS

Snyder, et al.,"So many options, So Little Time: The Roles of Association and Competition in Underdetermined Responding", In Proceedings of Psychonomic Bulletin & Review 2008, Dec. 2008, pp. 1083-1088.

Mnih, et al.,"A Fast and Simple Algorithm for Training Neural Probabilistic Language Models", In Proceedings of the 29th International Conference on Machine Learning, Jun. 25, 2012, 8 pages.

Carmignani, Nicola,"Predicting Words and Sentences using Statistical Models", Published on: Jul. 5, 2006, Available at: http://medialab.di.unipi.it/web/Language+Intelligence/Prediction.pdf.

Bengio, et al.,"A Neural Probabilistic Language Model", In Proceedings of Advances in Neural Information Processing Systems, Jun. 22, 2012, 7 pages.

Collobert, et al.,"Natural Language Processing (almost) from Scratch", In Journal of Machine Learning Research, vol. 12, Mar. 2011, 47 pages.

Socher, et al., "Semi-Supervised Recursive Autoencoders for Predicting Sentiment Distributions", In Proceedings of the Conference on Empirical Methods in Natural Language Processing, Jul. 2011, 11 pages.

Blackburn, et al., "Representation and Inference for Natural Language. A First Course in Computational Semantics", In CSLI Publications, Sep. 3, 1999, pp. 1 to 90 of 262 pages.

Blackburn, et al., "Representation and Inference for Natural Language. A First Course in Computational Semantics", In CSLI Publications, Sep. 3, 1999, pp. 91 to 180 of 262 pages.

Blackburn, et al., "Representation and Inference for Natural Language. A First Course in Computational Semantics", In CSLI Publications, Sep. 3, 1999, pp. 181 to 262 of 262 pages.

Finkelstein, et al.,"Placing Search in Context: The Concept Revisited", In Journal of ACM Transactions on Information Systems, vol. 20, Issue 1, Jan. 2002, 16 pages.

Mohammad, et al.,"Computing Word-Pair Antonymy", In Proceedings of the Conference on Empirical Methods in Natural Language Processing, Oct. 2008, 10 pages.

Chen, Stanley F., "Shrinking Exponential Language Models", In Proceedings of Human Language Technologies: The Annual Conference of the North American Chapter of the Association for Computational Linguistics, May 31, 2009, 9 pages.

Deerwester, et al.,"Indexing by Latent Semantic Analysis", In Journal of the American Society for Information Science, vol. 41, Issue 6, Sep. 1990, 17 pages.

* cited by examiner

GENERATING SENTENCE COMPLETION QUESTIONS

BACKGROUND

In sentence completion questions, such as for use in tutoring or testing students, a student is given a sentence that is missing a word, and the student attempts to choose the best option for filling in the blank from among several options. An example of a sentence completion question is, "John's car broke down, so he called to say that he would be [a) early b) late c) perplexed d) gangrenous e) positive]."

Currently, creating such questions is a very time-consuming process, because the creator first needs to "think up" a good sentence that uses a specific word, (e.g., on a college level exam, the sentences often may be twenty or more words long, and involve unusual words), and then formulate reasonable alternates to list among the options. Alternates generally need to be words that fit grammatically and read smoothly, but make no sense.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a sentence completion question is generated based at least in part on a language model. A sentence is located based upon data processed in association with the language model, and alternates for a word or words in the sentence are automatically provided based upon data processed from a language model.

In one aspect, a sentence filter and an alternates generator are implemented on one or more processors. The sentence filter is configured to select a sentence for a sentence completion question. The alternates generator is configured to provide a plurality of candidate alternates from which selected alternates are obtained. The selected alternates and the correct answer are output as a set of options for completing the sentence completion question.

In one aspect, there is described obtaining candidate sentences for a sentence completion question. The candidate sentences are filtered into a selected sentence based at least in part on a language model. Candidate alternates for the selected sentence are generated based at least in part on the language model. The candidate alternates are filtered and/or ranked, such that the sentence completion question, comprising the selected sentence with a removed word set (comprising one or more removed words) is output. The sentence completion question is associated with a set of options for completing the sentence, in which the set of options comprises the removed word set and selected alternates chosen from among the candidate alternates.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically suggesting sentence completion questions and alternates. In contrast to the taxing process for a human to create such sentences and alternates, given automatically suggested sentence completion questions and candidates for alternates, it is very easy for a human to simply accept or reject a sentence, and choose acceptable alternates from a larger list of candidates.

To this end, a statistical language model is used for creating sentence completion questions. The language model is used to select good "seed" sentences from a large database of sentences, containing a focus word (or possibly more than one, as a set of one or more words may be removed and presented as a blank or blanks in the sentence completion question) that correctly completes the sentence. The selection results in a fully formed question that is easy for a skilled user to either accept, reject or change.

The statistical language model is also used to suggest a set of alternates for the focus word. Providing candidate alternates may be accomplished automatically by sampling from the probability distribution over replacement words, given the remainder of the words in the sentence. The probability distribution may be specified by the language model, using the word N-grams present in the sentence, (which is basically impossible for a human to reason about manually). Other types of language models include whole-sentence and recurrent neural network language models.

It should be understood that any of the examples herein are non-limiting. For instance, the examples herein generally refer to having a single focus word that is to be completed in a sentence, however in other scenarios, more than one such focus word may be needed for completion and/or a larger structure such as a paragraph of multiple sentences may be the item needing completion. Further, while the elimination of synonyms among candidate alternates is described such that there is only one correct answer to a sentence completion question, it is feasible to have questions that allow synonyms (or multiple answers) that are also correct, e.g., a correct test answer may be listed among options 1) A; 2) B; 3) C; 4) A and B; 5) all of the above. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and natural language processing in general.

Figure 1:
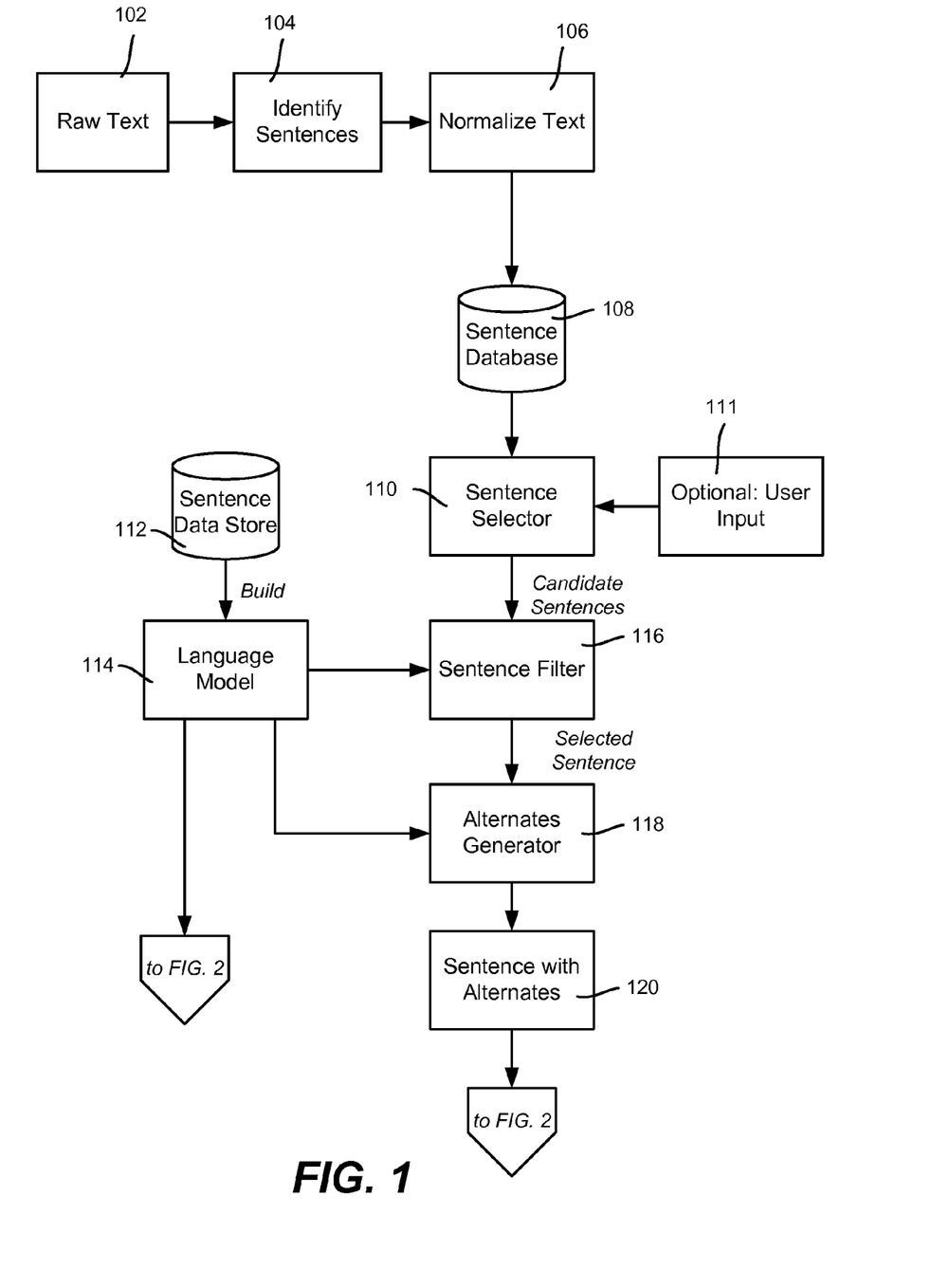
FIGS. 1 and 2 comprise a block diagram showing various example components that may be used to generate a sentence completion question, according to one example embodiment.

FIG. 1 shows a block diagram in which raw text 102 such as from a large corpus of literature, newspaper articles or the like is processed by a component 104 that identifies sentences therein. The component 104 may use any well-known techniques/rules to identify sentence boundaries; e.g., not all periods are sentence delimiters, as some are used in abbreviations, and known techniques/rules help overcome such problems. Rules and the like also may be used to normalize the text (block 106), e.g., an abbreviation such as "mr." may be capitalized via normalization to "Mr." for consistency.

The result is a sentence database 108 or other data store of sentences, from which a user or process may select one for use in teaching or testing via a sentence selector 110. For example, a user may provide optional input 111 specifying a particular vocabulary word (or list of words) with which to tutor or test a student, and the sentence selector 110 locates the appropriate sentences that contain the word (or words) in the sentence database 108. Alternatively, words to test may be identified in some other way, such as by grouping words into skill levels and randomly choosing words that match a given skill level, choosing rarely used words by low frequency of occurrence, and/or other ways, resulting in sentences containing the desired or chosen focus word or words being selected.

Separate from the raw text, a sentence data store 112 (e.g., a different large corpus typically including different sentences) is used to build an N-Gram language model 114. N-gram language models in general are well-known and thus not described herein in detail, except to describe how the information in the language model 114 may be used to generate sentence completion questions and alternates. Other types of language models which may be used include recurrent neural network models, feed-forward neural network models, and maximum entropy language models.

For desirable results, a sentence needs to be at least a certain number of words long, and contain a word that is relatively infrequent, (e.g., words such as "melancholy," "perplexed," "technological," and "recommended," in contrast to examples of frequent words such as "is," "and," "he," and "she.") For example, the process may select "I had forgotten about my obligations when the bank called and reminded me that my mortgage was past due." In this sentence, "obligations" is an infrequent word that may be selected as the focus word. The original sentence provides an example of how "obligations" is used correctly.

To this end, a sentence filter 116 may be used to remove sentences according to measures (such as length) and/or rules, which may be based at least in part on the language model 114. For example, the sentence filter 116 may filter (or possibly rank) the sentences by perplexity (a well-known measure in language models), with high language model perplexity favored over low perplexity. Other rules, such as "do not select sentences with embedded quotes" may be used to filter out sentences.

Once a focus word within a sentence is selected, (e.g., an infrequent word), alternates to that word are generated using an N-gram language model, e.g., a class-based maximum entropy N-gram model. These alternates may be generated according to a probability value, e.g., P(alternate|remainder of sentence). This may be accomplished by computing the probability of the completed sentence once for every possible vocabulary word, and then normalizing and sampling.

However, the normalization over all words is computationally expensive, and thus a sampling procedure based on only the preceding (e.g., two word) history may be used, followed by re-ordering of the alternates based on a larger context.

In the above example, to form a sentence completion question of the form "I had forgotten about my ______ when the bank called and reminded me that my mortgage was past due," with "obligations" being the correct word, the process seeks to find alternates to serve as incorrect options. To this end, an alternates generator 118 uses the N-gram language model 114 to sample words that are likely to follow the words immediately before the blank, resulting in a sentence with a set of alternates 120. In this example, (using a two-word sampling), the words immediately before the blank are "about my." For example, the process may sample "children," "car," "speed," "work," and "carburetor." The alternates may be chosen by the probability of missing words using the language model, along with the filtering out of high-frequency words such as "is," "she" and the like. More alternates (options) than are needed are generated, e.g., to generate four alternates, the process may generate on the order of one-hundred-and-fifty candidates. Note that the N-gram language model 114 uses only local context, and therefore many of the alternates will not make sense globally, even though they read well locally.

In one example implementation, to determine suitable alternates, one example procedure selects a focus word with overall frequency less than $10^{-4}$. For example, the word "extraordinary" in the sentence "It is really the most extraordinary and inexplicable business" may be selected as the focus word. The two-word history immediately preceding the selected focus word is used to predict alternates, e.g., "the most" in the above example. Some number of non-duplicated alternates, such as one-hundred and fifty, may be selected at this stage, each having a frequency of less than $10^{-4}$, for example. For example, "the most" locates infrequent alternates such as "handsome" and "luminous."

Probability scores are computed for the sentences using the N-gram language model 114, including the sentence with the original word and modified sentences with (at least some of) the alternate candidates. If the original (correct) sentence has a better probability score than with any of the alternates, the sentence, which at this time is still a candidate sentence, may be rejected. Otherwise, each alternate candidate is scored according to how well the option and its immediate predecessor predict the next word. For example, the probability of "and" following "most handsome" might be 0.012. The predicted words are sorted according to this score, with some number (e.g., thirty) of the top-ranked options retained. Note that "language model" as used herein may be a combination of more than one physical data model, e.g., the language model that is processed to select sentences and the language model that is processed to generate/rank alternates may be built and maintained as different physical entities, but in one implementation is the same physical entity.

Note that omitting questions for which the correct sentence is the "best" (in that the original/correct sentence has a better probability score than any of the alternates) makes the set of options more difficult to solve with a language model alone, and can be used to generate relatively difficult questions. Another possibility is to sample options based on the preceding history, reordering them according the total sentence probability $P(w_1 \ldots w_N)$.

The overall example procedure has the effect of providing alternates that are both well-predicted by the immediate history, and predictive of the immediate future. Because in total the procedure in this example implementation uses only four consecutive words, the procedure generally does not provide globally coherent alternates. However, sometimes the procedure does produce synonyms to the correct word, as well as syntactically invalid options, which need to be filtered out in scenarios where only one correct answer is to be provided among the options. One way to do this is to manually examine the alternates, possibly in conjunction with automated synonym detection and filtering.

For example, the alternates may be shown to a skilled person (e.g., a teacher or tutor or crowdsourcing employee) who can eliminate improper choices. As a more particular example, in the bank/mortgage sentence completion example question above, in which "obligations" was the correct answer, the N-gram sampling may produce "responsibilities," which in this context is a synonym for "obligations." This alternate cannot be properly shown as an option in a scenario that desires only one correct answer.

Figure 2:
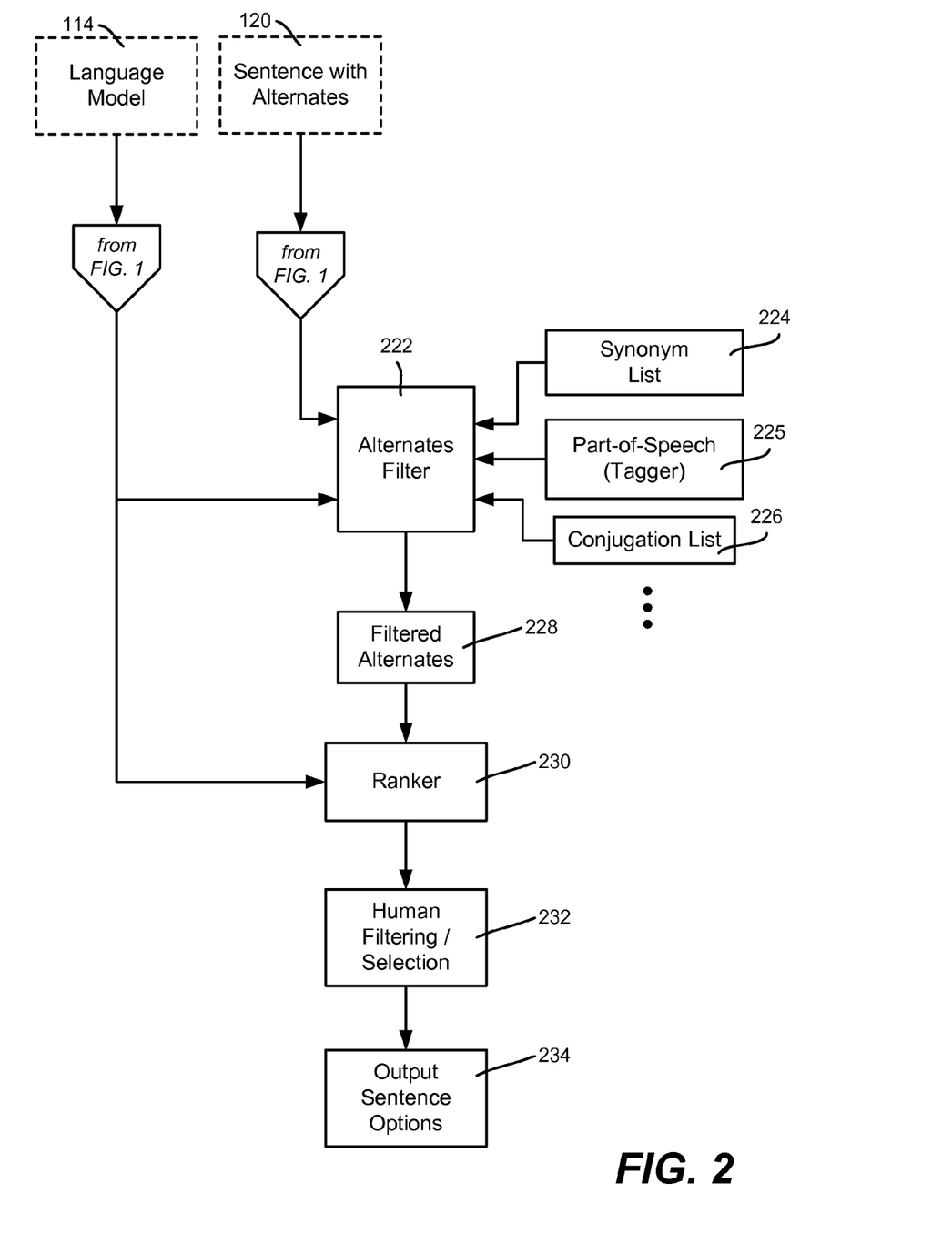

Alternatively, or in addition to manual filtering (e.g., before manual filtering), an automated filtering process (block 222) may be used to filter the proposed alternates based upon one or more elimination criteria. Example elimination criteria of such an automated filtering process may include eliminating synonyms of the original word from a list, thesaurus or the like (input block 224).

Automated filtering also may eliminate options that are labeled (by a part-of-speech tagger as filtering input 225) differently from the original word, e.g., verbs are only replaceable with verbs, nouns are only replaceable with nouns and so forth. Automated filtering also may perform conjugation-based filtering based upon input 226; e.g., for verbs, automated filtering may eliminate options that are conjugated differently from the original such that a past tense verb is only grammatically replaceable with past tense verb alternates, and so on. For nouns, automated filtering may eliminate options that disagree in number, e.g., so that a plural noun is only grammatically replaceable with plural alternates. Other automated filtering is feasible, e.g., hyphenated words, archaic words, words with too many or too few characters, which may be relative to the original correct words and so forth.

The result, whether via manual filtering or automated filtering, or a combination of both, performed in any order, is a set of filtered alternates 228.

Another aspect that may be used is to have a ranker 230 rank the candidate alternates according to criteria, such as criteria including the overall likelihood of the complete sentence according to the N-gram language model, and the probability of the word immediately after the proposed option. Note that ranking may occur before any filtering, (particularly if manual filtering is performed so that better ranked alternates are those a user first sees).

In the example embodiment shown in FIG. 2, ranking may occur after automated filtering (block 222) but before manual filtering/selection 232, for example, to facilitate the manual operation. The result is an output sentence completion question 234 with a set of options containing a correct answer and the final chosen alternates.

By way of one actual example, consider a large publicly available corpus intended to stimulate research into language modeling techniques that are sensitive to overall sentence coherence. One such test set comprises 1,040 sentences, (taken from Sherlock Holmes stories), each of which is missing a content word. A general goal is to provide a user with a sentence completion task to select the correct replacement from amongst five options. In general, all of the options are intended to be syntactically valid, and reasonable with respect to local N-gram statistics. One set was generated by using an N-gram language model to generate a long list of likely words, given the immediate context. These candidate alternates were manually reviewed, to identify four alternates (decoys/imposters) that are globally incoherent, yet syntactically correct. To this end, human judges picked the "best" four choices of impostor sentences from an automatically generated/filtered list of thirty alternate candidates, given the following instructions:

1. All chosen sentences should be grammatically correct.
2. Each correct answer should be unambiguous. In other words, the correct answer should always be a significantly better fit for that sentence than each of the four impostors; it should be possible to write down an explanation as to why the correct answer is the correct answer that would persuade most reasonable people.
3. Avoid sentences that might cause offense or controversy.
4. Ideally the alternatives will need some thought in order to determine the correct answer. For example, "Was she his [client|musings|discomfiture|choice|opportunity], his friend, or his mistress?" constitutes a good test sentence, because in order to arrive at the correct answer, the student needs to notice that, while "musings" and "discomfiture" are both clearly wrong, the terms friend and mistress both describe people, which therefore makes client a more likely choice than choice or opportunity.
5. Alternatives that require understanding properties of entities that are mentioned in the sentence are desirable. For example "All red-headed men who are above the age of [800|seven|twenty-one|1,200|60,000] years, are eligible" requires that the student realize that a man cannot be seven years old, or eight-hundred or more. However, such examples are relatively rare; most often, arriving at the correct answer requires thought, but not detailed entity knowledge.
6. Dictionary use is encouraged, if necessary.
7. A given sentence may only be used once. If more than one focus word has been identified for a sentence (i.e. different focuses have been identified, in different positions), choose the set of sentences that generates the best challenge, according to the above guidelines. Note that the alternates sometimes constitute a perfectly fine completion, but that in those cases, the correct completion is still clearly identifiable as the most likely completion.

The following sentences and alternates (from a larger set of candidates) are examples of sentences automatically chosen/generated for selection:

1) I have seen it on him, and could _________ to it.
   a) write b) migrate c) climb d) swear e) contribute
2) They seize him and use violence towards him in order to make him sign some papers to make over the girl's _________ of which he may be trustee to them.
   a) appreciation b) activity c) suspicions d) administration e) fortune
3) My morning's work has not been _________, since it has proved that he has the very strongest motives for standing in the way of anything of the sort.
   a) invisible b) neglected c) overlooked d) wasted e) deliberate
4) It was furred outside by a thick layer of dust, and damp and worms had eaten through the wood, so that a crop of livid fungi was _________ on the inside of it.
   a) sleeping b) running c) resounding d) beheaded e) growing
5) Presently he emerged, looking even more _________ than before.
   a) instructive b) reassuring c) unprofitable d) flurried e) numerous
6) We took no _________ to hide it.
   a) fault b) instructions c) permission d) pains e) fidelity
7) I stared at it _________, not knowing what was about to issue from it.
   a) afterwards b) rapidly c) forever d) horror-stricken e) lightly
8) The probability was, therefore, that she was _________ the truth, or, at least, a part of the truth.
   a) addressing b) telling c) selling d) surveying e) undergoing 9) The furniture was scattered about in every direction, with dismantled shelves and open drawers, as if the lady had hurriedly _______ them before her flight.

a) warned b) rebuked c) assigned d) ransacked e) taught

10) The sun had set and _______ was settling over the moor.

a) dusk b) mischief c) success d) disappointment e) laughter

As can be seen, the options available all make sense from the local N-gram point of view, and are syntactically valid; only semantic considerations allow the correct answer to be distinguished. This sort of question is useful because it is a widely used method for assessing human abilities.

In each question, a word has been removed, and the task is to choose from among five alternatives. One of the options is the original word, and the other four alternate "decoys" have been generated from an N-gram language model using local context. Sampling from an N-gram model is done to generate alternates which make sense locally, but for which there is no other reason to expect them to make sense globally. Note that it is a straightforward extension to generate other sentences with two (or more) words removed, with the user asked to select from among a set of possible insertions.

To ensure that synonyms of the correct answer are not present, and that the options are syntactically reasonable, the candidate alternates may be automatically filtered and ranked as described above, and/or hand-selected from among a large number of possibilities suggested by the N-gram model.

As can be readily appreciated, the development of models of global coherence is likely useful in a variety of tasks, not only for the generation of sentence completion questions for vocabulary tutoring/testing applications, but for other tasks. Example tasks include proof-reading, automated grading of essays and other student work and sentence generation in free-form dialog applications.

Figure 3:
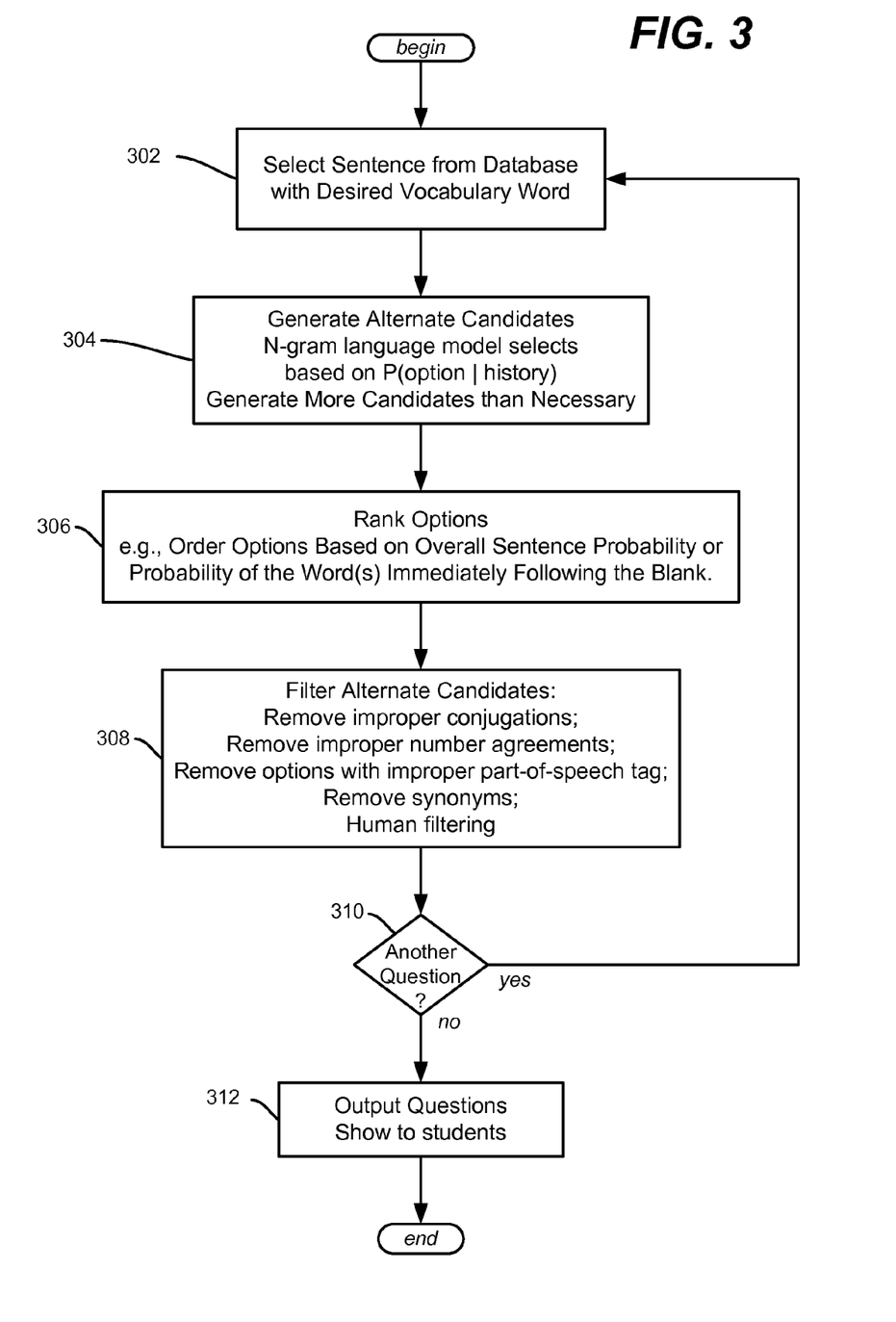
FIG. 3 is a flow diagram showing example steps of a sequence of operations that may be used generate a sentence completion question, according to one example embodiment.

FIG. 3 is a flow diagram summarizing example steps that may be taken to generate sentence completion questions. Step 302 represents selecting a sentence from the sentence database with a desired or other suitable vocabulary word. As described above, question generation may be accomplished by selecting a candidate sentence containing an infrequent word. The sentences that fit the word criterion also may be filtered by the perplexity of the sentence (sentences with a high language model perplexity tend to be more difficult than those with low perplexity).

Step 304 represents generating the candidate alternates, using the N-gram language model for selection based on P(alternate|history). More candidate alternates than necessary are generated. Note that if computationally feasible, all words may be considered as potential replacements. Frequent words such as "of," "the" and so forth may be filtered out. In one implementation, alternate candidates for a given word are automatically determined by sampling with an N-gram language model, e.g., using the immediate history as context, thus resulting in words that may "look good" locally, but for which there is no a-priori reason to expect them to make sense globally.

Step 306 represents the ranking of the options (sentences with the candidate alternates and the original) based on the overall sentence probability and/or the probability of the word immediately following the blank. For example, a measure of the probability of a given sentence may be computed as:

$$\prod_i P(w_i \mid w_{(i-1)} \ldots w_{(i-N+1)})$$

where the w's represent the words and N is the N-gram level.

Step 308 represents filtering the alternate candidates, (which as described above may occur at least in part before the ranking). Filtering removes candidates with improper conjugations, improper number agreements, improper part-of-speech tags and so forth. Note that a part-of-speech tagger may be run as part of this step or an earlier step. Filtering also may remove synonyms if appropriate for a given scenario that wants only one correct answer. Also, human filtering may be performed at this step, such as to eliminate choices that are clearly incorrect because they constitute grammatical errors or the like that were not detected by any automated filtering operations. A human may also prefer choices that need some semantic knowledge and/or logical inference to arrive at the correct answer, at which a human is likely more proficient.

Note that via randomizing techniques and given sufficient data, a researcher who knows exactly how the data was created, including knowing which data was used to train the language model, is still not able to use such information to obtain the correct answers. Thus, a language processing corpus may be designed to be non-solvable using purely N-gram based methods, and which instead requires some level of semantic processing.

Step 310 repeats the process until a desired number of questions are obtained. When the questions are ready, step 312 represents outputting those questions to students, test subjects or the like for obtaining their answers.

Example Operating Environment

Figure 4:
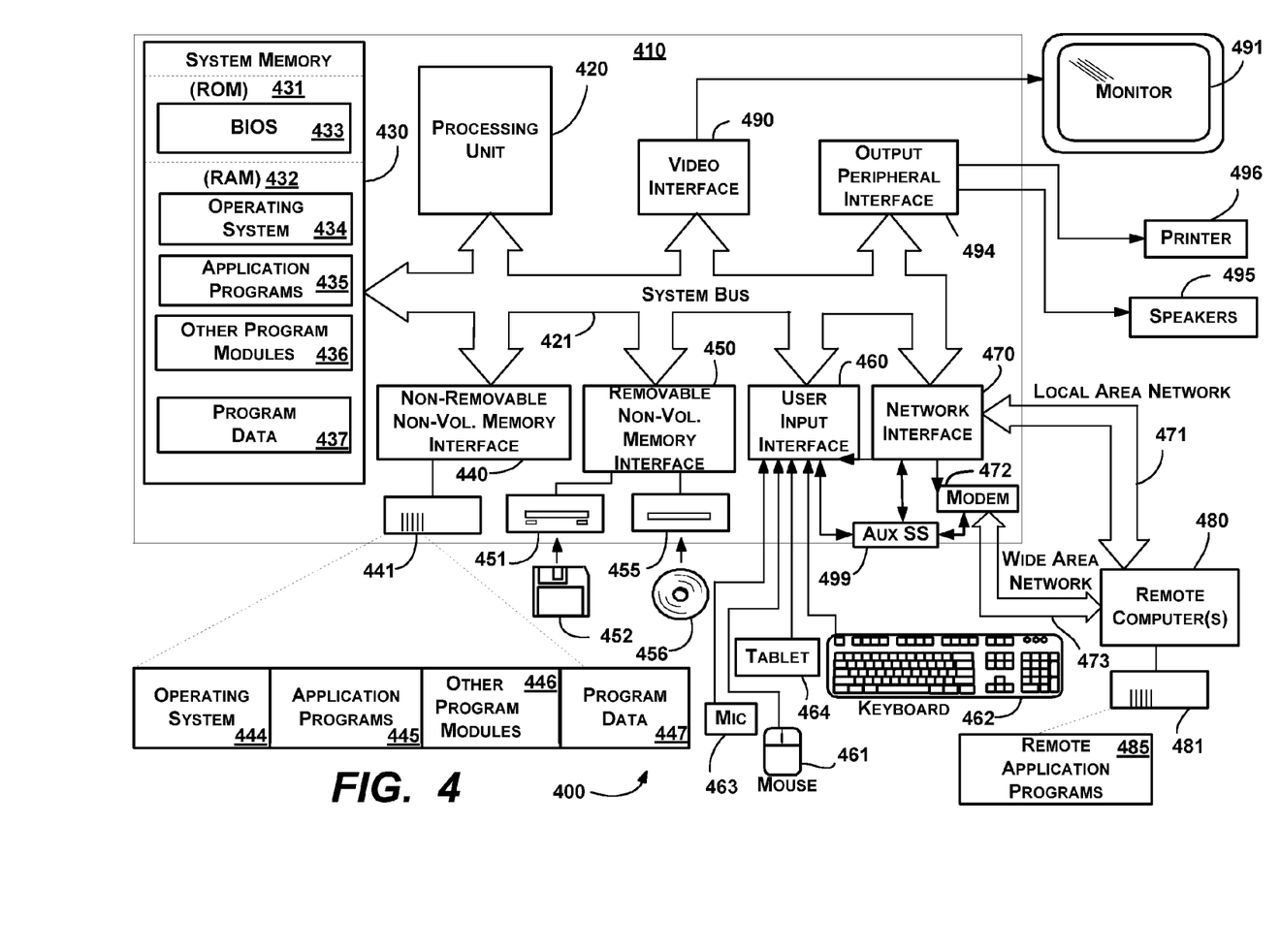
FIG. 4 is a block diagram representing an example computing environment into which aspects of the subject matter described herein may be incorporated.

FIG. 4 illustrates an example of a suitable computing and networking environment 400 into which the examples and implementations of any of FIGS. 1-6 may be implemented, for example. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the example operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an example system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are examples and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method performed at least in part on at least one processor, comprising:
   generating a sentence completion question based at least in part on a language model, including locating a sentence based upon data processed in association with the language model;
   using a class-based maximum entropy N-gram language model to generate a plurality of candidate alternates;
   providing, by an alternates generator implemented on the at least one processor, the plurality of candidate alternates from which selected alternates are obtained based upon data processed from the class-based maximum entropy N-gram language model; and
   outputting the sentence completion question and a set of options for completing the sentence completion question, the set of options comprising the selected alternates.

2. The computer-implemented method of claim 1 wherein locating the sentence comprises receiving an input focus word and accessing a data store of sentences to retrieve sentences containing the focus word.

3. The computer-implemented method of claim 2 further comprising,
   computing a probability score for the sentence containing the focus word, and computing a probability score for each modified sentence in which the focus word is replaced with an alternate.

4. The computer-implemented method of claim 2 further comprising,
   ranking the sentences based upon an overall sentence probability according to the N-gram language model.

5. The computer-implemented method of claim 1 further comprising,
   ranking the candidate alternates based upon a probability of a word immediately following a blank in the sentence completion question.

6. The computer-implemented method of claim 1 further comprising, filtering the candidate alternates.

7. The computer-implemented method of claim 6 wherein filtering the candidate alternates comprises performing automated synonym filtering.

8. The computer-implemented method of claim 6 wherein filtering the candidate alternates comprises performing automated part-of-speech filtering.

9. The computer-implemented method of claim 6 wherein filtering the candidate alternates comprises performing automated conjugation filtering.

10. In a computing environment, a system comprising:
    one or more processors;
    a sentence filter implemented on the one or more processors, the sentence filter configured to select a sentence for a sentence completion question using an N-gram language model, and
    an alternates generator implemented on the one or more processors, the alternates generator configured to use a class-based maximum entropy N-gram language model to generate a plurality of candidate alternates and provide the plurality of candidate alternates from which selected alternates are obtained, the selected alternates and a correct answer being output as a set of options for completing the sentence completion question.

11. The system of claim 10 wherein the alternates generator accesses the class-based maximum entropy N-gram language model to provide the plurality of candidate alternates.

12. The system of claim 10 further comprising an alternates filter implemented on the one or more processors, the alternates filter configured to eliminate one or more candidate alternates based upon evaluating the candidate alternates against one or more elimination criteria.

13. The system of claim 12 wherein the one or more elimination criteria comprises at least one of synonym data, part-of-speech data, or conjugation data.

14. The system of claim 10 further comprising an alternates ranker implemented on the one or more processors, the alternates ranker configured to rank candidate alternates based upon probability data determined from an N-gram language model.

15. The system of claim 10 wherein the set of options comprises a single correct answer and two or more alternates.

16. The system of claim 10 wherein the sentence completion question comprises a sentence with a single word left blank for completion with a word selected from among the set of options.

17. One or more computer-readable devices having computer-executable instructions, which when executed perform steps, comprising,
    obtaining candidate sentences for a sentence completion question;
    filtering the candidate sentences into a selected sentence based at least in part on a language model;
    using a class-based maximum entropy N-gram language model to generate a plurality of candidate alternates for the selected sentence based at least in part on the class-based maximum entropy N-gram language model;
    filtering the candidate alternates;
    ranking the candidate alternates based on probability data determined from the class-based maximum entropy N-gram language model; and
    outputting the sentence completion question comprising the selected sentence with a removed word set comprising one or more removed words and a set of options for completing the sentence, the set of options comprising the removed word set and selected alternates chosen from among the candidate alternates.

18. The one or more computer-readable devices of claim 17 wherein ranking the candidate alternates further comprises:
ranking the candidate alternates based upon a probability of a word immediately following a blank in the sentence completion question.

19. The one or more computer-readable devices of claim 17 wherein filtering the candidate alternates comprises performing automated conjugation filtering.

20. The one or more computer-readable devices of claim 17 wherein filtering the candidate alternates comprises performing automated synonym filtering.

* * * * *